(12) United States Patent
Rintaluoma et al.

(10) Patent No.: US 9,179,155 B1
(45) Date of Patent: Nov. 3, 2015

(54) SKIPPED MACROBLOCK VIDEO ENCODING ENHANCEMENTS

(75) Inventors: Tero Mikko Rintaluoma, Oulu (FI); Sami Aleksi Pietilä, Oulu (FI)

(73) Assignee: GOOGLE INC., Mountain View, CA (US)

( * ) Notice: Subject to any disclaimer, the term of this patent is extended or adjusted under 35 U.S.C. 154(b) by 666 days.

(21) Appl. No.: 13/523,255

(22) Filed: Jun. 14, 2012

(51) Int. Cl.
*H04N 7/12* (2006.01)
*H04N 11/02* (2006.01)
*H04N 11/04* (2006.01)
*H04N 19/167* (2014.01)
*H04N 19/23* (2014.01)
*H04N 19/17* (2014.01)
*G06T 7/20* (2006.01)

(52) U.S. Cl.
CPC ............. *H04N 19/167* (2014.11); *H04N 19/17* (2014.11); *H04N 19/23* (2014.11); *G06T 7/2006* (2013.01)

(58) Field of Classification Search
CPC ..... H04N 19/17; H04N 19/23; H04N 19/167; G06T 7/2006
USPC ........................................ 375/240.01–240.29
See application file for complete search history.

(56) References Cited

U.S. PATENT DOCUMENTS

| | | | |
|---|---|---|---|
| 6,912,255 B2 | 6/2005 | Drezner et al. | |
| 7,418,147 B2 | 8/2008 | Kamaci et al. | |
| 7,437,007 B1 * | 10/2008 | Augustine et al. | 382/235 |
| 8,121,188 B2 | 2/2012 | Marpe et al. | |
| 8,126,054 B2 | 2/2012 | Hsiang | |
| 8,135,068 B1 | 3/2012 | Alvarez et al. | |
| 2003/0120664 A1 | 6/2003 | Davidson et al. | |
| 2004/0028131 A1 | 2/2004 | Ye et al. | |
| 2005/0201469 A1 | 9/2005 | Sievers et al. | |
| 2005/0254719 A1 | 11/2005 | Sullivan | |
| 2006/0182350 A1 | 8/2006 | Kondo et al. | |
| 2006/0239636 A1 | 10/2006 | Sugiyama et al. | |
| 2007/0294245 A1 | 12/2007 | van Baarsen et al. | |
| 2007/0297517 A1 | 12/2007 | Cho et al. | |
| 2008/0056354 A1 | 3/2008 | Sun et al. | |
| 2008/0219573 A1 * | 9/2008 | Lu | 382/236 |
| 2008/0279466 A1 | 11/2008 | Yang | |
| 2009/0196515 A1 * | 8/2009 | Kim et al. | 382/236 |
| 2010/0329345 A1 | 12/2010 | Andersson et al. | |

OTHER PUBLICATIONS

Mozilla, "Introduction to Video Coding," 171 pages, http://people.xiph.org/~tterribe/pubs/lca2012/auckland/intro_to_video1.pdf, Last accessed Apr. 12, 2012.

* cited by examiner

*Primary Examiner* — Andy Rao
*Assistant Examiner* — Jared Walker
(74) *Attorney, Agent, or Firm* — Young Basile Hanlon & MacFarlane P.C.

(57) ABSTRACT

Systems and methods for encoding a video stream based upon identified regions of interest (ROI's) are disclosed herein. Standard video encoding schemes require a significant amount of unnecessary data in order to designate macroblocks to be skipped for a particular video frame of a video stream. Rather than encoding such skip or no skip information for each macroblock (or sequence of macroblocks) for each frame, embodiments disclosed herein can encode the video stream based upon an identified ROI that represents an area of macroblocks that change and/or do not remain static from one frame to the next. Designating active areas in terms of the ROI can yield more efficient encoding.

9 Claims, 10 Drawing Sheets

Macroblocks of first frame 106 are encoded and only macroblocks included in ROI 116 are encoded for set of subsequent frames 108. Bits traditionally used to designate skipped macroblocks are not needed

SKIPPED MACROBLOCK VIDEO ENCODING ENHANCEMENTS

TECHNICAL FIELD

This disclosure generally relates to enhancing the efficiency of video encoding in connection with skipped macroblock information.

BACKGROUND

Conventional video encoding utilizes a number of techniques to reduce the size of a compressed video stream. Reducing the size of this data can allow the data to be transferred over a network more efficiently and decoded and/or decompressed at the destination. In certain domains such as video conferencing or remote desktop applications, a common scenario arises in which many macroblocks of the video do not change often from one frame of a video stream to the next frame. In those cases, data from an early video frame macroblock can be used to render an associated macroblock of a later frame of the video stream as long as the data in the macroblock does not substantially change from one frame to the next.

As a result of this technique, virtually all video encoding schemes provide a mechanism to flag a macroblock to be skipped. That is, if a macroblock is flagged to be skipped in a given frame, it is understood that the image within that area (the macroblock) of the video can be simply copied from the previous frame. Therefore, such data in subsequent frames need not be encoded and need not be transferred over a network in order to be rendered correctly at the destination.

Many encoding standards include a single bit field in a header associated with each macroblock to indicate whether the macroblock is to be skipped or not. If the field is set, then no video data for that macroblock is encoded and the decoder simply uses the data from a previous frame of the video. Thus, in cases where a macroblock does not change from one frame of a video stream to the next, the entire macroblock can effectively be represented by a single bit of data.

Other modern video encoding standards include in a macroblock header a number of skipped blocks. For applications that include a large number of consecutive skipped macroblocks, these encoding standards can represent the entire macroblock with approximately 0.1 bits by simply encoding in the header that the macroblock is to be skipped as are the next 10 macroblocks. Such techniques have enabled very sophisticated video applications to be utilized over conventional communications networks such as the Internet. However, conventional techniques still encode a significant amount of information to represent these skipped blocks.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems and methods disclosed herein relate to video encoding that more efficiently represent skipped macroblocks. A receiving component can be configured to receive a video stream that includes a first frame and a set of subsequent frames. A grid component can be configured to divide frames of the video stream into a set of macroblocks (e.g., a 16×16 pixel block). A motion component can be configured to identify a region of interest (ROI) that corresponds to macroblocks in the set of macroblocks that are not substantially static (e.g., do not substantially change from one frame to the next frame). An encoding component can be configured to encode the first frame and to encode only macroblocks included in the ROI of the set of sequent frames.

Other embodiments relate to decoding systems and methods. For example, a receiving component can be configured to receive an encoded video stream that includes a first frame and a set of subsequent frames. A header component can be configured to examine a header associated with the encoded video stream and to identify at least one ROI associated with macroblocks that are not substantially static based upon at least one ROI reference. A decoding component can be configured to decode the encoded video stream and to output a presentation that displays a decoded image of the first frame and updates the decoded image only within the at least one ROI for the set of subsequent frames.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
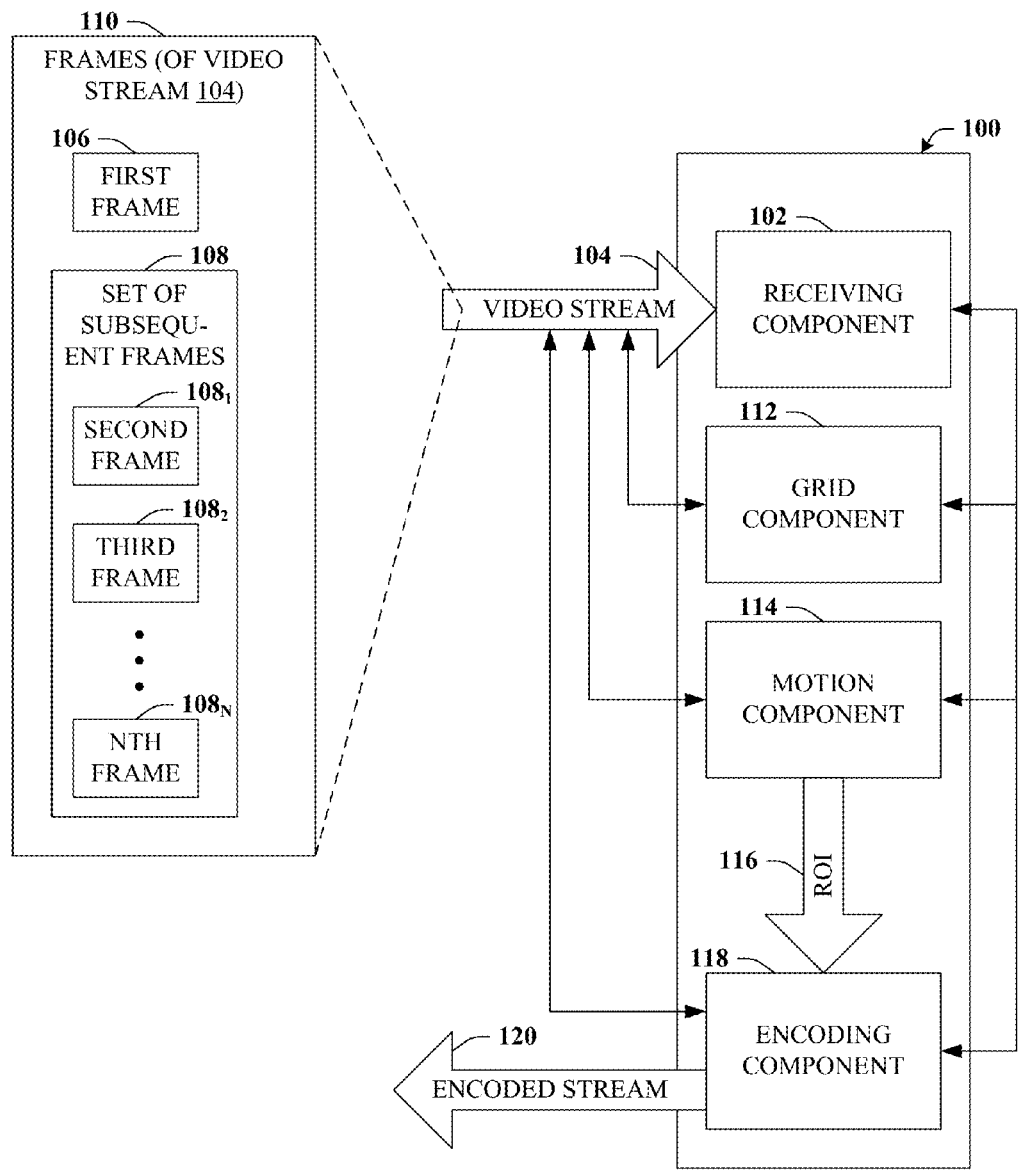
FIG. 1 illustrates a high-level block diagram of an example system that can encode a video stream based upon a region of interest (ROI) in accordance with certain embodiments of this disclosure.

Encoding in Connection with a Region of Interest

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Referring now to FIG. 1, a system 100 is depicted. System 100 can encode a video stream based upon a region of interest (ROI). The disclosed subject matter can, for example, reduce or remove inefficiencies extant in conventional systems that flag skipped macroblocks. System 100 can include a memory that stores computer executable components and a processor that executes computer executable components stored in the memory, examples of which can be found with reference to FIG. 9. In addition, system 100 can include a receiving component 102, a grid component 112, a motion component 114, and an encoding component 118.

Receiving component 102 can be configured to receive video stream 104 that includes a first frame 106 and a set of subsequent frames 108. Set of subsequent frames 108 includes second frame $108_1$, third frame $108_2$, and so on to the Nth frame $108_N$, where N can be substantially any number. In this example, video stream 104 includes some number of frames, N, that are collectively represented as frames 110. Each of the frames 110 can individually represent an entire screen or windowed image, with motion appearing to a human observer as one frame updates the previous frame. In order to simulate real motion on display devices, successive frames are typically displayed at a number of frames per second, such as 30 frames per second. In such cases, 1 second of video stream 104 would typically require frames 110 to include at least 30 frames (e.g., first frame 106 and set of subsequent frames including at least 29 members).

Each of the frames 110 can be partitioned into smaller (generally equally-sized) portions. For example, grid component 112 can divide all or a portion of one or more of frames 110 into a grid or set of macroblocks. In some embodiments, a single macroblock can represent a 16×16 block of pixels within a given frame. However, it is understood, as used herein, a macroblock can represent substantially any useful size or shape associated with all or a portion of an associated video frame.

Motion component 114 can be configured to identify a region of interest (ROI) 116 that corresponds to macroblocks in the set of macroblocks that are not substantially static. For example, macroblocks that sufficiently change from one frame to the next can be identified as dynamic or not static and therefore included in ROI 116. Motion component 114 can identify ROI 116 by defining an area of contiguous macroblocks. Such identification can be based upon known motion detection or estimation techniques with respect to individual macroblocks. For a given frame included in frames 110, multiple regions of interest 116 can identified. Thus, although for the sake of simplicity examples provided herein relate to a single ROI 116, it is readily understood the disclosed subject matter is not so limited.

Encoding component 120 can be configured to encode first frame 106 and to encode only macroblocks included in ROI 116 of set of subsequent frames 108. For set of subsequent frames 108, macroblocks that do not change (e.g., remain static) from one frame to the next do not require encoding the screen image data. Rather, such data can be copied from first frame 106 and/or from a previous member of frames 110. However, rather than expressly identifying which macroblocks can be skipped for each video frame as is done in conventional encoding schemes, the ROI 116 can represent instead an identification of which macroblocks are not to be skipped for the next N frames. Thus, macroblock headers do not need to include a flag to designate whether or not to skip that particular macroblock, which can result in a significant increase in encoding efficiency.

Figure 2:
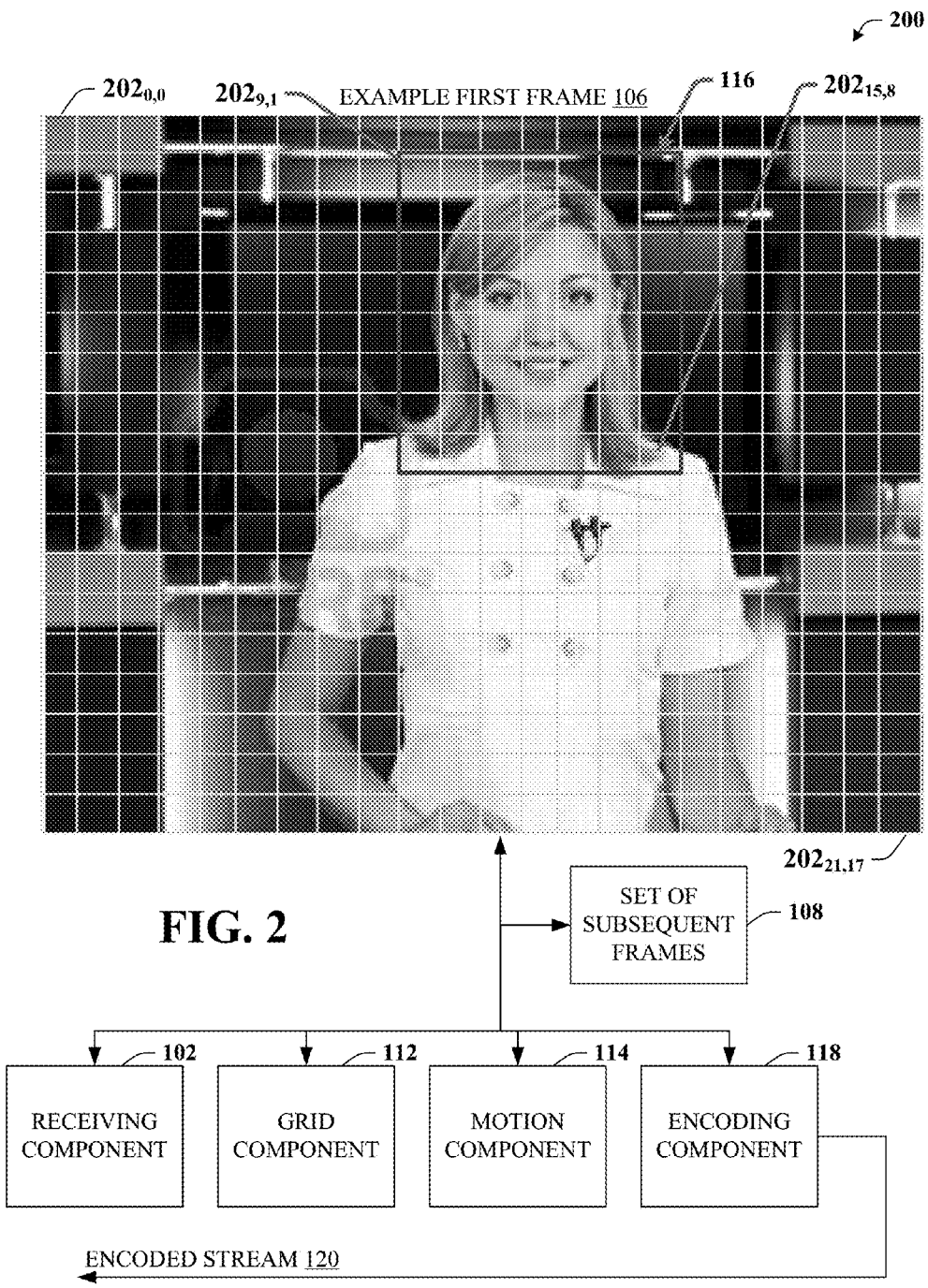
FIG. 2 depicts an example block diagram of a system that can encode a video stream based upon an ROI with a graphical illustration of the first frame of the video stream in accordance with certain embodiments of this disclosure.

While still referring to FIG. 1, but turning also to FIG. 2, system 200 is depicted. System 200 provides a graphical illustration of the first frame of the video stream to further emphasize various features of system 100. As used herein, first frame 106 is intended to represent the first frame of video stream 104 in which a particular ROI 116 or set of ROI's 116 are defined. For example, consider a scenario in which six ROI's 116 are determined for the first 10 seconds of video stream 104. During the first 10 seconds, first frame 106 can be the very first frame of video stream 104. However, further consider that between 10 seconds and 14 seconds, two regions of interest are identified, in which case first frame 106 might represent the first frame of video stream 104 after the 10-second mark.

As detailed previously, receiving component 102 can receive video stream 104 that can include first frame 106 (graphically represented) and set of subsequent frames 108. Grid component 112 can divide first frame 106 into discrete partitions, denoted macroblocks 202. In this example, each macroblock 202 represents a 16-pixel by 16-pixel block of first frame 106. In this case, first frame 106 represents a video image that is 22 by 18 macroblocks (e.g., each row includes 22 macroblocks and each column includes 18 macroblocks) for a screen/window size of 352 pixels by 288 pixels. In this example, the upper-left macroblock is denoted $202_{0,0}$ and the lower-right macroblock is denoted $202_{21,17}$. Similar notation is employed to describe other relevant macroblocks, however it is understood that other representations and/or indexing of macroblocks can be used. Although not graphically illustrated, grid component 112 can provide similar delineations of macroblocks with respect to all or a portion of the frames included in set of subsequent frames 108.

Based upon analysis by motion component 114, ROI 116 can be identified. In this example, ROI 116 represents a 7 by 8 macroblock rectangle bounded by macroblock $202_{9,1}$ and macroblock $202_{15,8}$. For example, ROI 116 includes macroblocks that change from frame-to-frame as the actor in video stream 104 moves her head and mouth and other facial features. In contrast, macroblocks outside of ROI 116 do not change substantially from one frame to the next.

Encoding component 118 can encode first frame 106 in its entirety, thereby capturing all pixel data included in first frame 106. However, for the set of subsequent frames 108, encoding component 118 can encode only macroblocks included in ROI 116, since it is only in that area that the video image changes over time. For macroblocks outside of ROI 116, data encoded in first frame 106 can be used, as that data will be the same over time.

In this manner, bits traditionally used to designate skipped macroblocks are not needed. In many domains such as video conferencing, streaming news broadcasts, remote desktop applications or other domains in which some portion of the video stream does not change substantially, significant savings in compression ratio can be realized over conventional schemes by not encoding skipped macroblock bits.

To illustrate, consider a high definition video conference that streams 1920×1080 pixel video sequences. Such would represent approximately 120 macroblocks by 68 macroblocks for a total of 8,160 macroblocks per frame. Thus, conventional encoding techniques, although designating skipped macroblocks with a single bit, can still require 8,160 bits (e.g., approximately 8 kilobytes) per frame to encode this information. Given that a frame rate of about 30 frames per second (fps) effectuates real motion, a video conference of a mere 1 minute at 30 fps will require more than 14 megabytes just to designate, for all macroblocks, whether or not to skip any given macroblock.

By comparison, that same information (e.g., information relating to which blocks to skip or not) that requires about 14 megabytes to represent according to conventional approaches can be provided with a few bytes based upon ROI 116. For example, using the video conference example above, only one or a small number of ROI's would likely be identified by motion component 114. Much like the example illustrated by first frame 106 of FIG. 2, ROI 116 would encompass the head and/or upper torso regions of a video conference participant. If it is assumed only one ROI 116 is identified, and further that ROI does not change for the entire minute, then only a few bytes are needed to encode what requires several megabytes to encode by conventional means. Moreover, if multiple ROI's 116 exist, the data size necessary to encode those ROI's 116 only grows by a factor of the number of ROI's 116 and/or the number of times the ROI's 116 change.

In contrast, conventional encoding schemes grow linearly with the number of frames. Thus, for example, a one-hour video conference with conventional encoding schemes could require a cumulative total (multiple parties sending and receiving) of many additional gigabytes of data to encode skipped blocks. Various examples relating to encoding based upon ROI 116 are provided in connection with FIG. 3.

Figure 3:
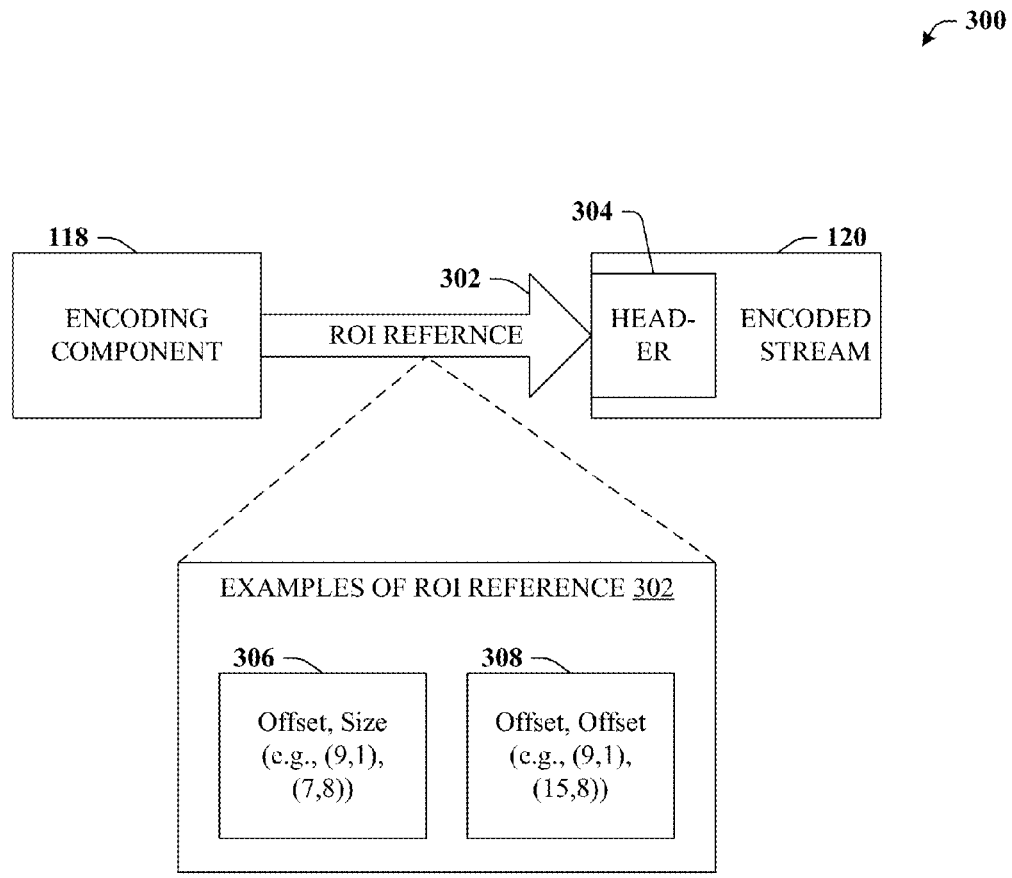
FIG. 3 illustrates a block diagram of a system that can provide for additional features in connection with the encoding component in accordance with certain embodiments of this disclosure.

Referring now to FIG. 3, system 300 is provided. System 300 depicts additional features in connection with encoding component 118. In some embodiments, encoding component 118 can be configured to include ROI reference 302 in a header 304 of encoded stream 120. Header 304 can relate to a frame header (e.g., a header associated with first frame 106) or can be included in a macroblock header of a video frame.

In some embodiments, ROI reference 302 can include an offset and size, which is detailed in connection with reference numeral 306. Referencing again FIG. 2, ROI 116 begins at macroblock $202_{9,1}$ and spans an area of 7 macroblocks by 8 macroblocks. In this case, the offset portion of ROI reference 302 can be 9,1 and the size portion of ROI reference 302 can be 7,8. In other embodiments, ROI reference 302 can be described by a first offset and a second offset, which is detailed in connection with reference numeral 308. For example, again leveraging ROI 116 of FIGS. 2, 9,1 and 15,8 can represent a first offset and a second offset, respectively.

Figure 4:
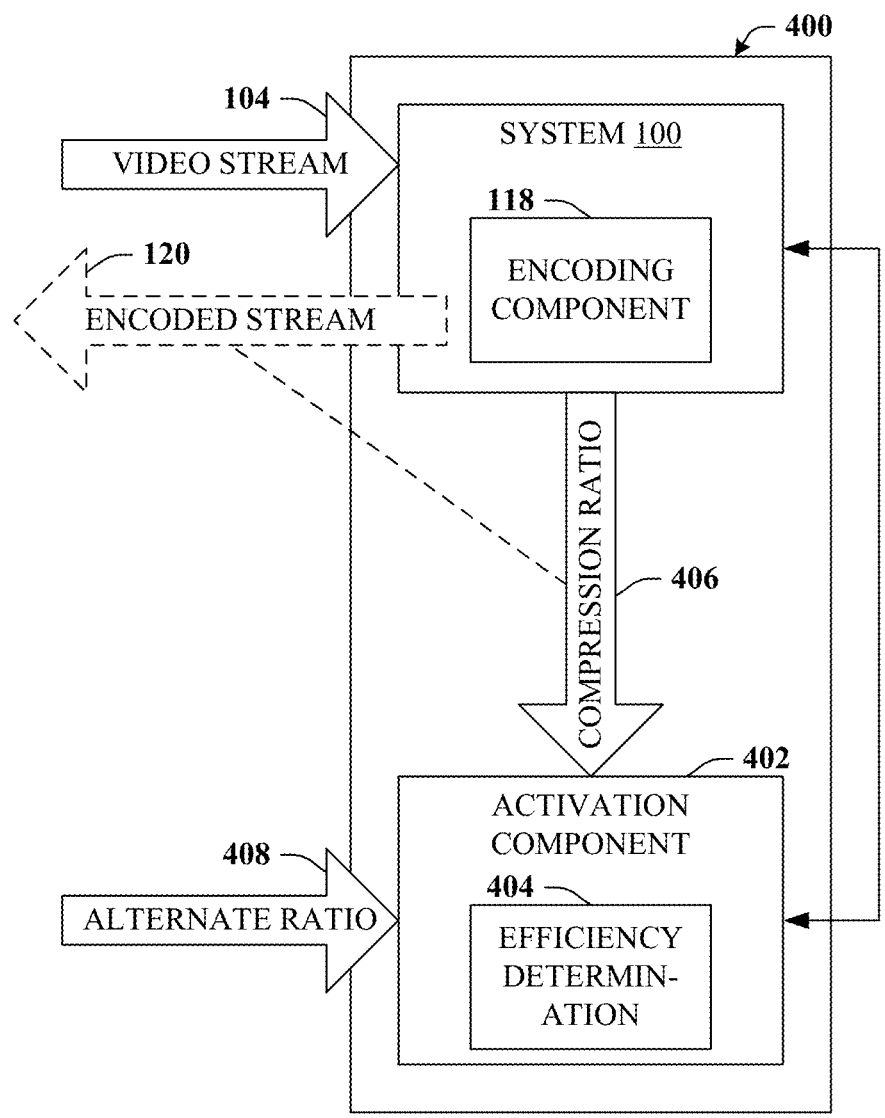
FIG. 4 illustrates a block diagram of a system that can activate encoding based upon an ROI when compression can be improved in accordance with certain embodiments of this disclosure.

With reference now to FIG. 4, system 400 is depicted. System 400 can activate encoding based upon ROI 116 when compression can be improved. System 400 can include all or a portion of system 100 that can receive video stream 104 and construct (e.g., by way of encoding component 118) encoded stream 120 based upon one or more ROI's 116. In addition, system 400 can include activation component 402 that can be configured to activate encoding component 118 in response to efficiency determination 404. For example, encoding component 118 that encodes video stream without conventional skipped macroblock designations can be activated according to a signal from activation component 402. If encoding component 118 is not activated (e.g., based upon efficiency determination 404), then video stream 104 can be encoded by an alternative encoding scheme.

In some embodiments, efficiency determination 404 can relate to a comparison between compression ratio 406 provided by encoding component 118 and alternative ratio 408 provided by an alternative encoding scheme (not shown). Compression ratio 406 can be the ratio of compression of video stream 104 that would be provided by encoded stream 120 when employing encoding based upon ROI's 116 as detailed herein. Compression ratio 406 can be an estimation determined based upon a macroblock size of ROI's 116 in proportion to a total number of macroblocks in the set of macroblocks.

Alternative ratio 408 can relate to an estimated compression ratio of video stream provided by a conventional encoding scheme or some other alternative encoding scheme. Alternative ratio 408 can be determined based upon at least one of motion estimation of the set of macroblocks or mode selection of the set of macroblocks.

Decoding in Connection with a Region of Interest

Figure 5:
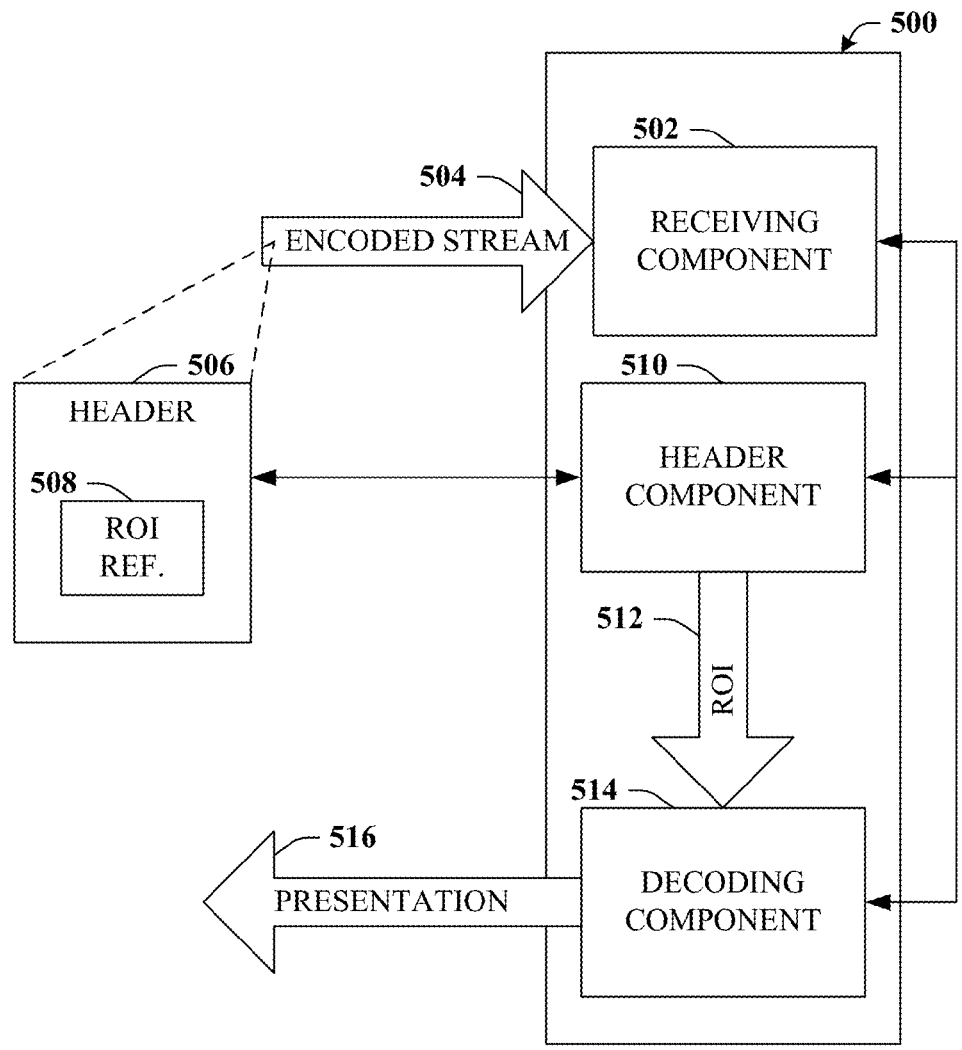
FIG. 5 illustrates a block diagram of a system that can decode an encoded video stream that is encoded based upon one or more ROI's rather than based upon conventional designations relating to skipping particular macroblocks in accordance with certain embodiments of this disclosure.

Referring now to FIG. 5, system 500 is depicted. System 500 can decode an encoded video stream that is encoded based upon one or more ROI's rather than based upon conventional designations relating to skipping particular macroblocks. System 500 can include a memory that stores computer executable components and a processor that executes computer executable components stored in the memory, examples of which can be found with reference to FIG. 9. In addition, system 100 can include a receiving component 502, a header component 510, and a decoding component 514.

Receiving component 502 can be configured to receive encoded stream 504 that includes a first frame and a set of subsequent frames. By way of illustration, encoded stream 504 can be substantially similar to encoded stream 120 provided by encoding component 118 or any other suitable video stream that is encoded based upon identifying a region of interest. Encoded stream 504 can include one or more headers 506, for example, frame headers or even various macroblock headers. At least one ROI reference 508 can be included in one or more header 506 of encoded stream 504.

Header component 510 can be configured to examine header 506 that is associated with encoded video stream 504. Header component 510 can also be configured to identify at least one ROI 512 associated with macroblocks that are not substantially static based upon the at least one ROI reference 508. In some embodiments, macroblocks can represent a 16×16 block of pixels within a frame.

Decoding component 514 can be configured to decode encoded stream 504 and further configured to output presentation 516. Presentation 516 can display a decoded image of the first frame and update that decoded image only within the at least one ROI 512 for the set of subsequent frames. For macroblocks not included in the at least one ROI 512, presentation 516 can display the same data that was included in the first frame.

In some embodiments, the at least one ROI reference 508 can indicate a macroblock offset associated with the at least one ROI 512 and an ROI size associated with the at least one ROI 512. For example, the macroblock offset can be, e.g., 9,1 and the ROI size can be 7,8 indicating a size of 7 macroblocks by 8 macroblocks. In other embodiments, the at least one ROI reference 508 can indicate a first macroblock offset and a second macroblock offset. For example, the first macroblock offset can be 9,1 and the second macroblock offset can be 15,8.

With regard to various systems and methods detailed herein, it is understood that in some embodiments pixel data representing one or more ROI (e.g., ROI 116, 512) can originate from a different source than the pixel data associated with macroblocks outside of ROI's. For example, two or more video streams can be employed, with one stream relating to a first ROI, another stream relating to a second ROI, and a third stream relating to non-ROI macroblocks.

In some embodiments, alpha channel information can be associated with ROI's. For example, foreground ROI's can be transparent to some degree. It is also understood that in the event multiple ROI's are utilized, ROI's can overlap with one another.

Figure 6:
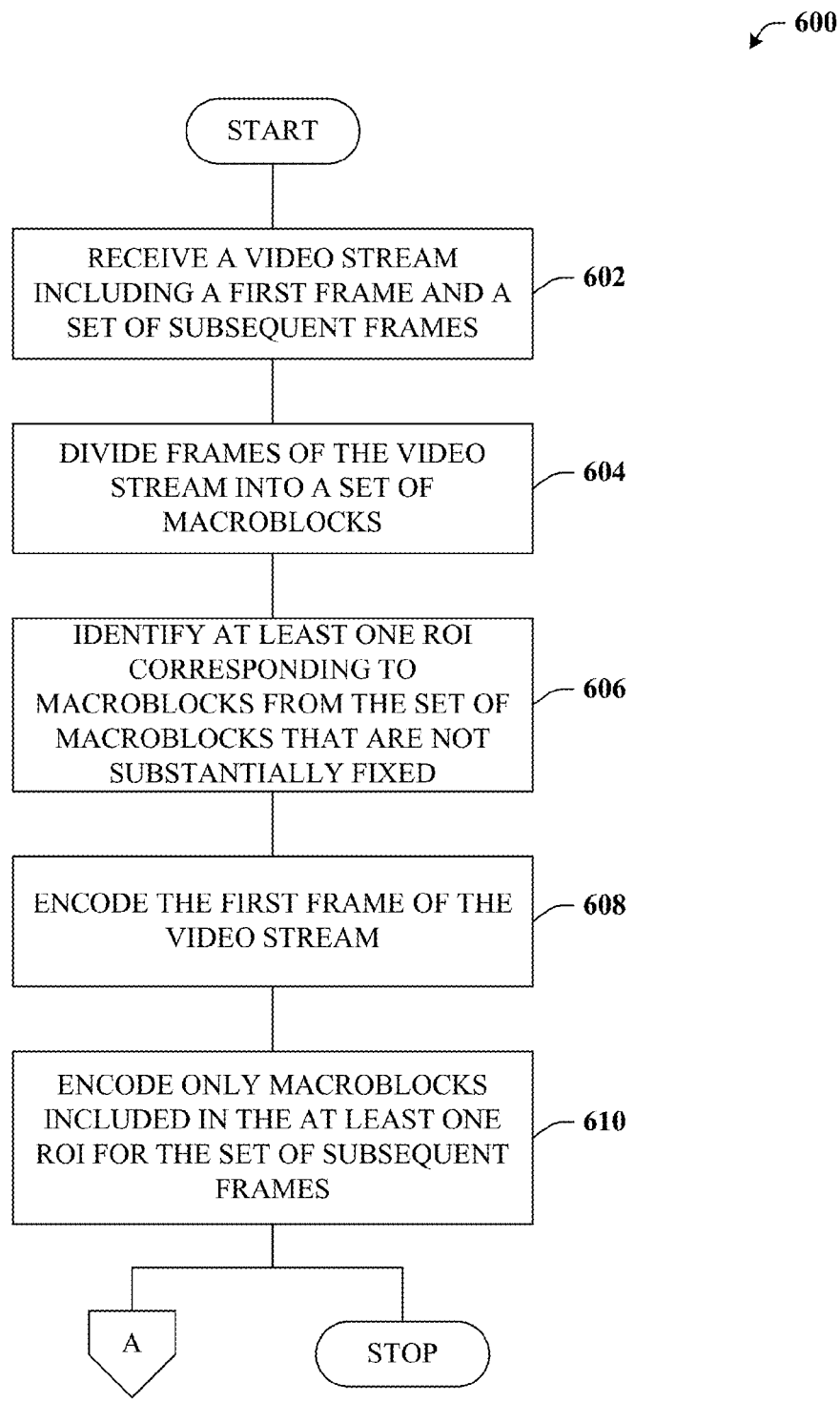
FIG. 6 illustrates an example methodology that can encode a video stream based upon an identified ROI in accordance with certain embodiments of this disclosure.
Figure 7:
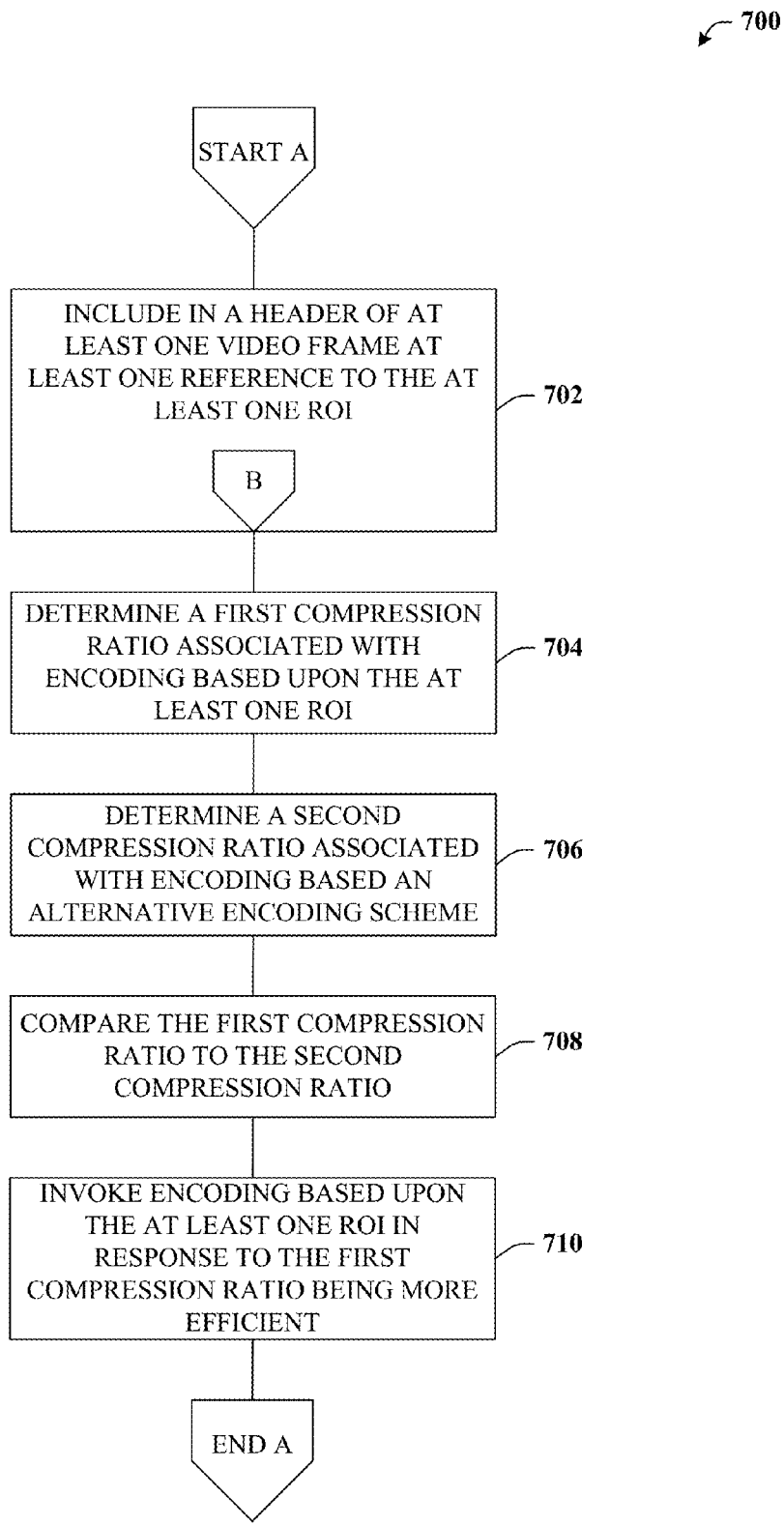
FIG. 7 illustrates an example methodology that can provide for additional features associated with encoding a video stream based upon an identified ROI in accordance with certain embodiments of this disclosure.
Figure 8:
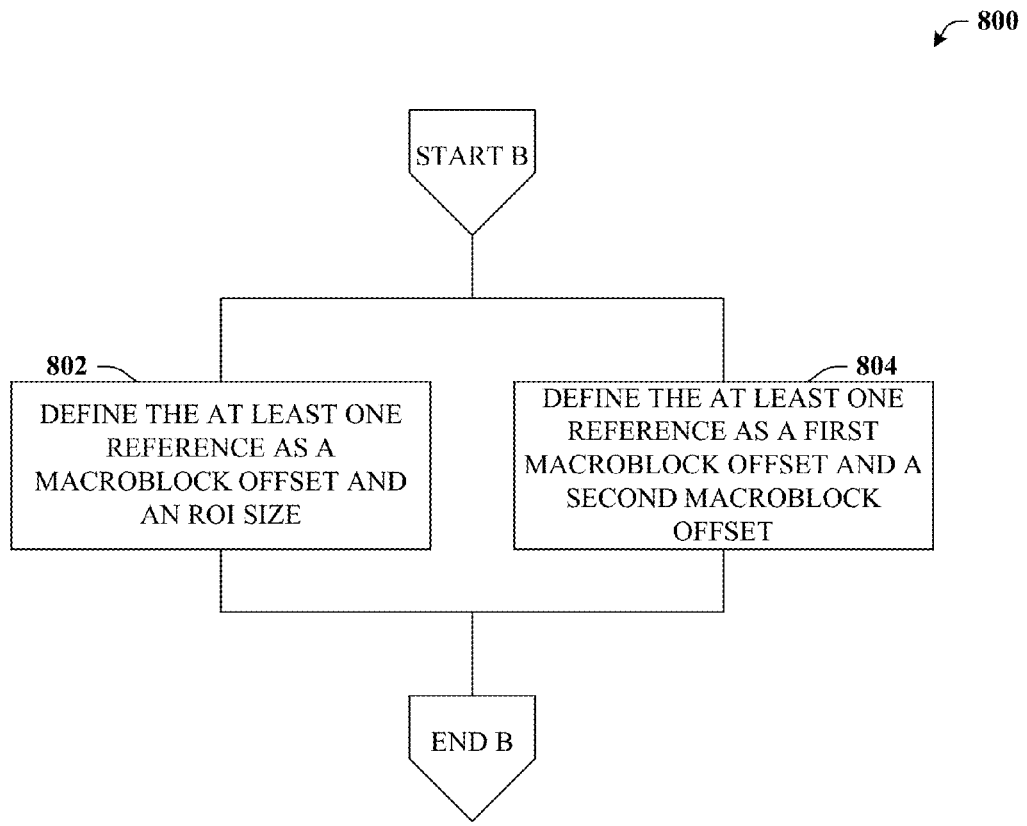
FIG. 8 illustrates an example methodology that can provide for various means of defining a reference to an ROI in a header in accordance with certain embodiments of this disclosure.

FIGS. 6-8 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 6 illustrates exemplary method 600. Method 600 can encode a video stream based upon an identified ROI rather than expressly flagging individual or a sequence of macroblocks that are to be skipped. For example, at reference numeral 602, a video stream including a first frame and a set of subsequent frames can be received. The video stream can relate to, e.g., a video conferencing session, a remote desktop application, a streaming broadcast, or the like.

At reference numeral 604, one or more frames of the video stream can be divided into a set of macroblocks. Generally, such macroblocks will be equally sized, usually about 16×16 pixels, however, other embodiments can exist. Pixels included in some of these macroblocks will not change from one frame to the next or will not change enough to reach a threshold determined by the encoding scheme and/or quality preferences. In other cases, the pixels of other macroblocks will not change, e.g., will remain substantially fixed from one frame to the next.

In the latter case, at reference numeral 606, at least one ROI corresponding to macroblocks in the set of macroblocks that are not substantially fixed can be identified. Thus, an area or multiple areas included in a given frame of the video stream that change from one frame to the next can be designated as the at least one ROI.

At reference numeral 608, the first frame of the video stream can be encoded, which can compress all data for the first frame. At reference numeral 610, only macroblocks included in the at least one ROI are encoded for the set of subsequent frames. Data outside the at least one ROI need not be encoded, as such data are static from one frame to the next and can therefore be supplied by associated data included in a previous frame. This encoding does not require a bit per frame per macroblock, but rather only requires the amount of data necessary to identify the at least one ROI for the video stream and/or the next predetermined N frames of the video stream.

Turning now to FIG. 7, exemplary method 700 is depicted. Method 700 can provide for additional features associated with encoding a video stream based upon an identified ROI. For example, at reference numeral 702, at least one reference to the at least one ROI can be included in a header of an encoded video stream provided as output at reference numeral 610 of FIG. 6. This reference (or references) can identify the size and position of the at least one ROI in terms of macroblock coordinates.

At reference numeral 704, a first compression ratio associated with encoding based upon the at least one ROI can be determined. At reference numeral 706, a second compression ratio associated with encoding based upon an alternative encoding scheme can be determined.

At reference numeral 708, the first compression ratio can be compared to the second compression ratio, for example to determine which type of encoding is determined or estimated to be more efficient. At reference numeral 710, the encoding based upon the at least one ROI can be invoked in response to the first compression ratio being more efficient.

Turning now to FIG. 8, example method 800 is illustrated. Method 800 can provide for different means of defining a reference to an ROI in a header in connection with reference numeral 702 of FIG. 7. Method 800 can begin with the start of insert B. In one or more embodiments, method 800 proceeds to reference numeral 802. At reference numeral 802, the at least one reference can be defined as a macroblock offset and an ROI size. Hence, the ROI size can describe the size (in macroblocks) of the ROI and the macroblock offset can describe the location of, e.g., the upper-left macroblock of the ROI.

In other embodiments, method 800 proceeds to reference numeral 804. At reference numeral 804, the at least one reference can be defined as a first macroblock offset and a second macroblock offset. For example, the first macroblock offset can represent the upper-left macroblock and the second macroblock offset can represent the lower-right macroblock. After either reference numeral 802 or 804 is executed, method 800 ends.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
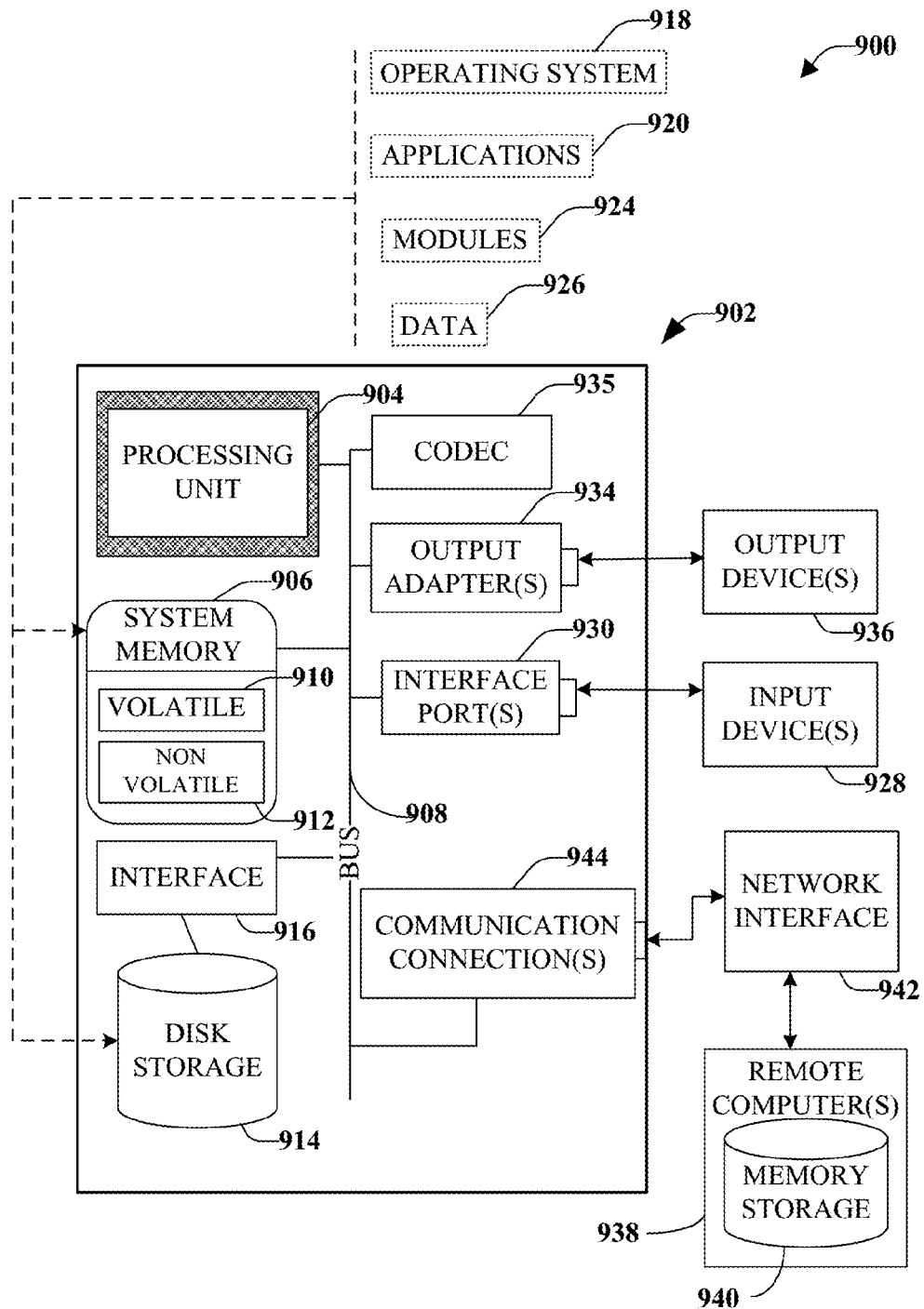
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. For example, in one or more embodiments, all or portions of codec 935 can be included in encoding component 118 and/or decoding component 514. Although, codec 935 is depicted as a separate component, codec 935 may be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, Jaz drive, Zip drive, LS-100 drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to opt-in or opt-out of having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
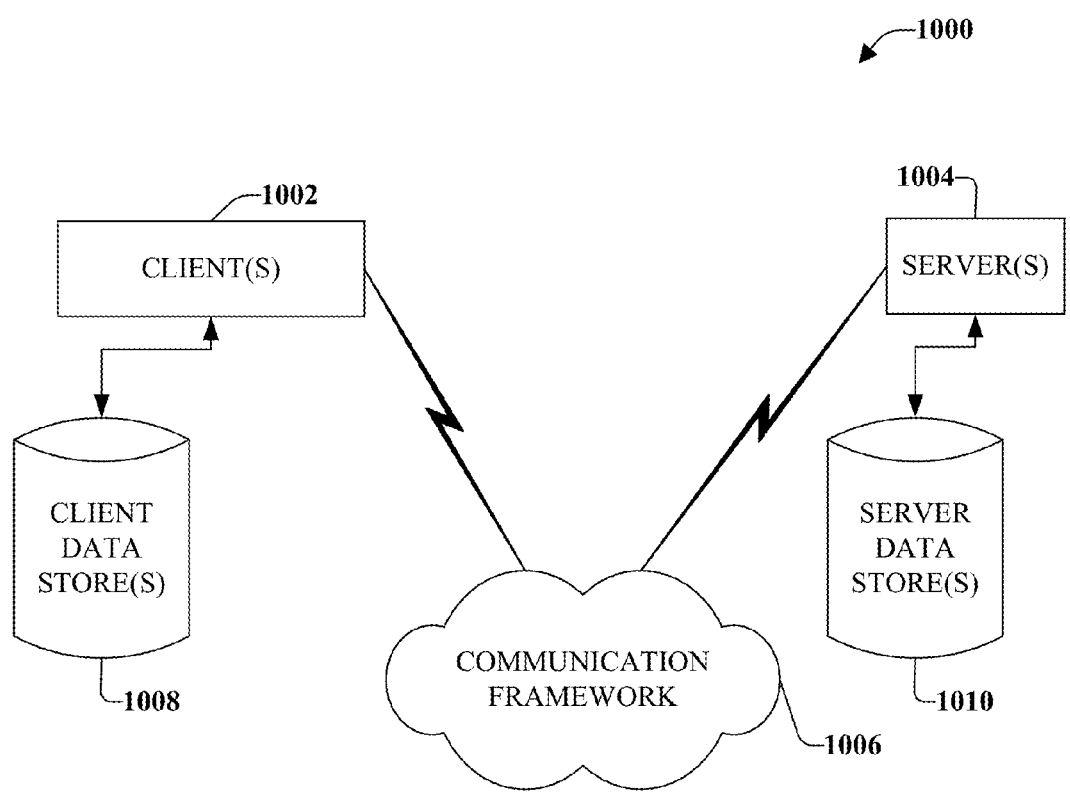
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A method, comprising:
    identifying a current frame from a plurality of input frames;
    identifying a region of interest in the current frame, wherein the region of interest includes a plurality of blocks;
    generating an encoded current frame by encoding the current frame;
    including, by a processor in response to instructions stored on a non-transitory computer readable medium, the encoded current frame in an output bitstream such that the output bitstream omits information corresponding to blocks from the frame other than the plurality of blocks from the region of interest and such that the output bitstream omits information indicating that a block from the frame is a skipped block, wherein including the encoded current frame in the output bitstream includes including an indication of the region of interest in the output bitstream, wherein the indication of the region of interest includes an offset and a size for the region of interest; and
    transmitting or storing the output bitstream.

2. The method of claim 1, wherein including the encoded current frame in the output bitstream includes including a header for the current frame in the output bitstream, the header including the indication of the region of interest.

3. The method of claim 1, wherein including the encoded current frame in the output bitstream such that the output bitstream omits information corresponding to blocks from the frame other than the plurality of blocks from the region of interest includes:
    including the encoded current frame in the output bitstream such that the output bitstream omits information indicating that a particular plurality of blocks from the frame are skipped blocks.

4. A method comprising:
    identifying a frame from an input video stream, wherein the frame includes a plurality of blocks;
    identifying a plurality of contiguous motion blocks from the plurality of blocks, such that blocks from the plurality of blocks that are omitted from the plurality of contiguous motion blocks are static blocks;
    generating an encoded frame by encoding the plurality of contiguous motion blocks;
    including, by a processor in response to instructions stored on a non-transitory computer readable medium, the encoded frame in an output bitstream, such that the output bitstream omits information corresponding to the static blocks, and such that the output bitstream omits information indicating that a block from the frame is a skipped block, wherein including the encoded current frame in the output bitstream includes including an indication of plurality of contiguous motion blocks in the output bitstream, wherein the indication of the plurality of contiguous motion blocks includes an offset and a size for the plurality of contiguous motion blocks; and
    storing or transmitting the output bitstream.

5. The method of claim 4, wherein including the encoded frame in the output bitstream includes including a header for the frame in the output bitstream, the header including:
    a horizontal offset indicating a horizontal position of a top-left block from the plurality of contiguous motion blocks in the frame;
    a vertical offset indicating a vertical position of the top-left block from the plurality of contiguous motion blocks in the frame;
    a horizontal size indicating a horizontal position of a bottom-right block from the plurality of contiguous motion blocks in the frame; and
    a vertical size indicating a vertical position of the bottom-right block from the plurality of contiguous motion blocks in the frame.

6. The method of claim 4, wherein including the encoded frame in the output bitstream includes:
    including the encoded frame in the output bitstream such that the output bitstream omits information indicating that a contiguous plurality of static blocks from the frame are skipped blocks.

7. A method comprising:
    receiving an encoded video stream, the encoded video stream including an encoded current frame;
    generating, by a processor in response to instructions stored on a non-transitory computer readable medium, a decoded frame by decoding the encoded current frame, wherein decoding the encoded current frame includes decoding a plurality of contiguous motion blocks from the encoded current frame, such that the decoded frame includes a plurality of static blocks and wherein the encoded current frame omits information corresponding to the plurality of static blocks, wherein the encoded video stream omits information indicating that a block from the encoded current frame is a skipped block, and wherein the encoded video stream includes an indication of plurality of contiguous motion blocks, wherein the indication of the plurality of contiguous motion blocks includes an offset and a size for the plurality of contiguous motion blocks; and outputting the decoded frame for presentation.

8. The method of claim 7, wherein decoding the encoded current frame includes decoding a header, the header including:

a horizontal offset indicating a horizontal position of a top-left block from the plurality of contiguous motion blocks in the decoded frame;

a vertical offset indicating a vertical position of the top-left block from the plurality of contiguous motion blocks in the decoded frame;

a horizontal size indicating a horizontal position of a bottom-right block from the plurality of contiguous motion blocks in the decoded frame; and a vertical size indicating a vertical position of the bottom-right block from the plurality of contiguous motion blocks in the decoded frame.

9. The method of claim 7, wherein decoding the encoded current frame includes decoding the encoded current frame on a condition that the encoded video stream omits information indicating that a contiguous plurality of blocks are skipped blocks.

* * * * *